US012314459B2

(12) United States Patent
Edwards et al.

(10) Patent No.: US 12,314,459 B2
(45) Date of Patent: May 27, 2025

(54) PROTECTING USER DATA PRIVACY IN A PRIVACY ZONE

(71) Applicant: Capital One Services, LLC, McLean, VA (US)

(72) Inventors: Joshua Edwards, Philadelphia, PA (US); Dan Lin, Arlington, VA (US); Michael Mossoba, Great Falls, VA (US)

(73) Assignee: Capital One Services, LLC, McLean, VA (US)

( * ) Notice: Subject to any disclaimer, the term of this patent is extended or adjusted under 35 U.S.C. 154(b) by 416 days.

(21) Appl. No.: 17/727,977

(22) Filed: Apr. 25, 2022

(65) Prior Publication Data

US 2023/0342505 A1    Oct. 26, 2023

(51) Int. Cl.
*G06F 21/00* (2013.01)
*G06F 21/62* (2013.01)
*G06F 21/84* (2013.01)

(52) U.S. Cl.
CPC .......... *G06F 21/84* (2013.01); *G06F 21/6245* (2013.01)

(58) Field of Classification Search
CPC .............................. G06F 21/84; G06F 21/6245
See application file for complete search history.

(56) References Cited

U.S. PATENT DOCUMENTS

| | | | |
|---|---|---|---|
| 9,075,974 B2 * | 7/2015 | Barr | G06F 21/32 |
| 10,311,249 B2 | 6/2019 | Sharifi et al. | |
| 10,824,769 B2 * | 11/2020 | Liu | G06F 21/629 |
| 10,936,760 B1 * | 3/2021 | Hadsall | G06F 21/32 |
| 11,030,350 B2 * | 6/2021 | Yost | G06F 21/84 |
| 2021/0182439 A1 | 6/2021 | Singh | |
| 2021/0350033 A1 | 11/2021 | Kapinos et al. | |
| 2022/0188456 A1 * | 6/2022 | Vaughan | G06F 21/6254 |
| 2022/0397686 A1 * | 12/2022 | Scacchi | G01S 19/485 |

FOREIGN PATENT DOCUMENTS

WO    WO-2014200589 A2 *  12/2014  .......... G01S 17/003

* cited by examiner

*Primary Examiner* — Kendall Dolly
(74) *Attorney, Agent, or Firm* — Sterne, Kessler, Goldstein & Fox, P.L.L.C.

(57) ABSTRACT

Disclosed herein are system, method, and computer program product embodiments for protecting user data privacy in a privacy zone around a user and a computing device displaying user data. A device can include a camera configured to capture a sequence of images in a location, such as in a privacy zone comprising an area around the device and a user of the device. A memory can be coupled to the camera to store the sequence of images. A monitoring device can be configured to determine, based on the sequence of images, whether an object is found in the location. In response to finding an object, the monitoring device can generate a control signal to cause the device to take an action to protect the user data privacy in the location such as a privacy zone.

20 Claims, 5 Drawing Sheets

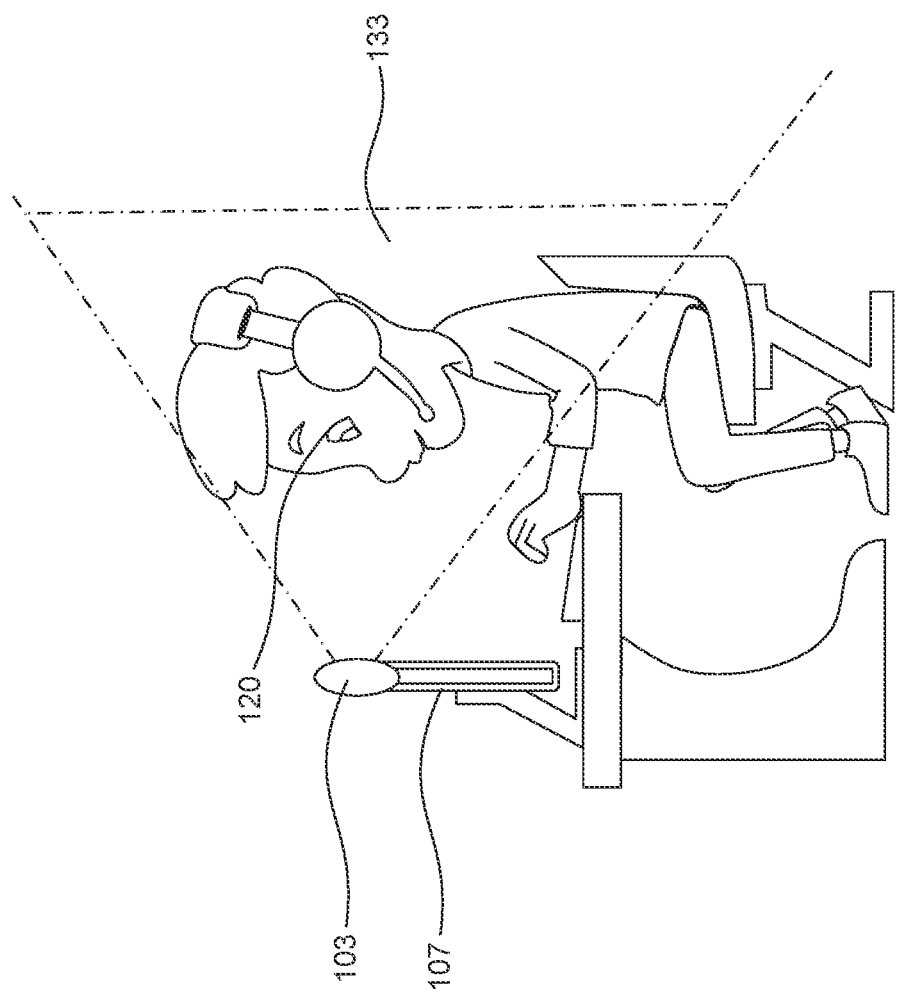

PROTECTING USER DATA PRIVACY IN A PRIVACY ZONE

BACKGROUND

Electronic commerce and e-government may conduct business by relying on online interactions and transactions between a computing device used by a customer or a user and a server managed by the government or an institution, such as a financial institution. To conduct ecommerce or e-government service, a user can use various computing devices, such as a personal computer, laptop, tablet, smart phone, etc. to interact with a website hosted by the server managed by the government or the institution. In addition, a standalone computing device may also present some sensitive or personal data. In various situations, the data displayed on a computing device may be at security risk to be compromised.

BRIEF SUMMARY

Disclosed herein are system, apparatus, device, method and/or computer program product embodiments, and/or combinations and sub-combinations thereof, for protecting user data privacy in a privacy zone around the user and a computing device displaying user data. When data is displayed on a computing device, the privacy of the data can be compromised by someone in a privacy zone with access to the data, such as by someone looking over the shoulder of the user. Embodiments herein present techniques and mechanisms to protect the user data privacy in a privacy zone around the user and the computing device.

In some embodiments, a device can include a camera configured to capture a sequence of images in a location, such as around a privacy zone comprising an area around the device and a user of the device. A memory can be coupled to the camera to store the sequence of images. A monitoring device can be configured to determine, based on the sequence of images, whether an object is found in the location. In response to finding an object, the monitoring device can generate a control signal to cause the device to take an action to protect the user data privacy in the location such as the privacy zone.

Descriptions provided in the summary section represent only examples of the embodiments. Other embodiments in the disclosure may provide varying scopes different from the description in the summary. In some examples, systems and computer program products of the disclosed embodiments may include a computer-readable device storing computer instructions for any of the methods disclosed herein or one or more processors configured to read instructions from the computer readable device to perform any of the methods disclosed herein.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the arts to make and use the embodiments.

FIGS. 1A-1B show block diagrams of a system for taking an action to protect data privacy when an unauthorized intrusion to a location is detected, according to some embodiments.

In the drawings, like reference numbers generally indicate identical or similar elements. Additionally, generally, the left-most digit(s) of a reference number identifies the drawing in which the reference number first appears.

DETAILED DESCRIPTION

A computing device can interact with a website hosted by a server managed by a government or an institution to conduct ecommerce or e-government service. In various situations, the data displayed on the computing device may be at security risk to be compromised. When a display device of a computing device has financial data displayed, privacy of the financial data can be compromised when someone looks over the shoulder of the user, catching information of the financial data in a reflection, or taking photos of the financial data, etc. Financial data may need privacy protection for security reasons or personal reasons. For example, a financial account can be compromised if financial data is obtained by an unauthorized person. In addition, financial data may need privacy protection for personal reasons. A user may not want a friend or a child to know the financial data of the user account in a financial institution. Other kinds of data besides financial data may need privacy protection as well. In the description herein, a computing device may be referred to as a device.

In some embodiments, a device can include a camera configured to capture a sequence of images in a location, such as in a privacy zone, e.g., an area around the device and a user of the device. When a user logs into a user account using the device, the camera installed on the device can capture a purview of the user, such a location or a privacy zone.

In some embodiments, a privacy zone can be an area around the device and a user of the device, where data displayed on a display device of the device is viewable by an unauthorized person or an unauthorized device. For example, a privacy zone can be an area over a shoulder of a user or behind the user.

In some embodiments, a memory can store the sequence of images. A monitoring device can be configured to determine, based on the sequence of images, whether an object is found in the location. In response to finding an object, the monitoring device can generate a control signal to cause the device to take an action to protect the user data privacy in the location such as the privacy zone.

Figure 1A:
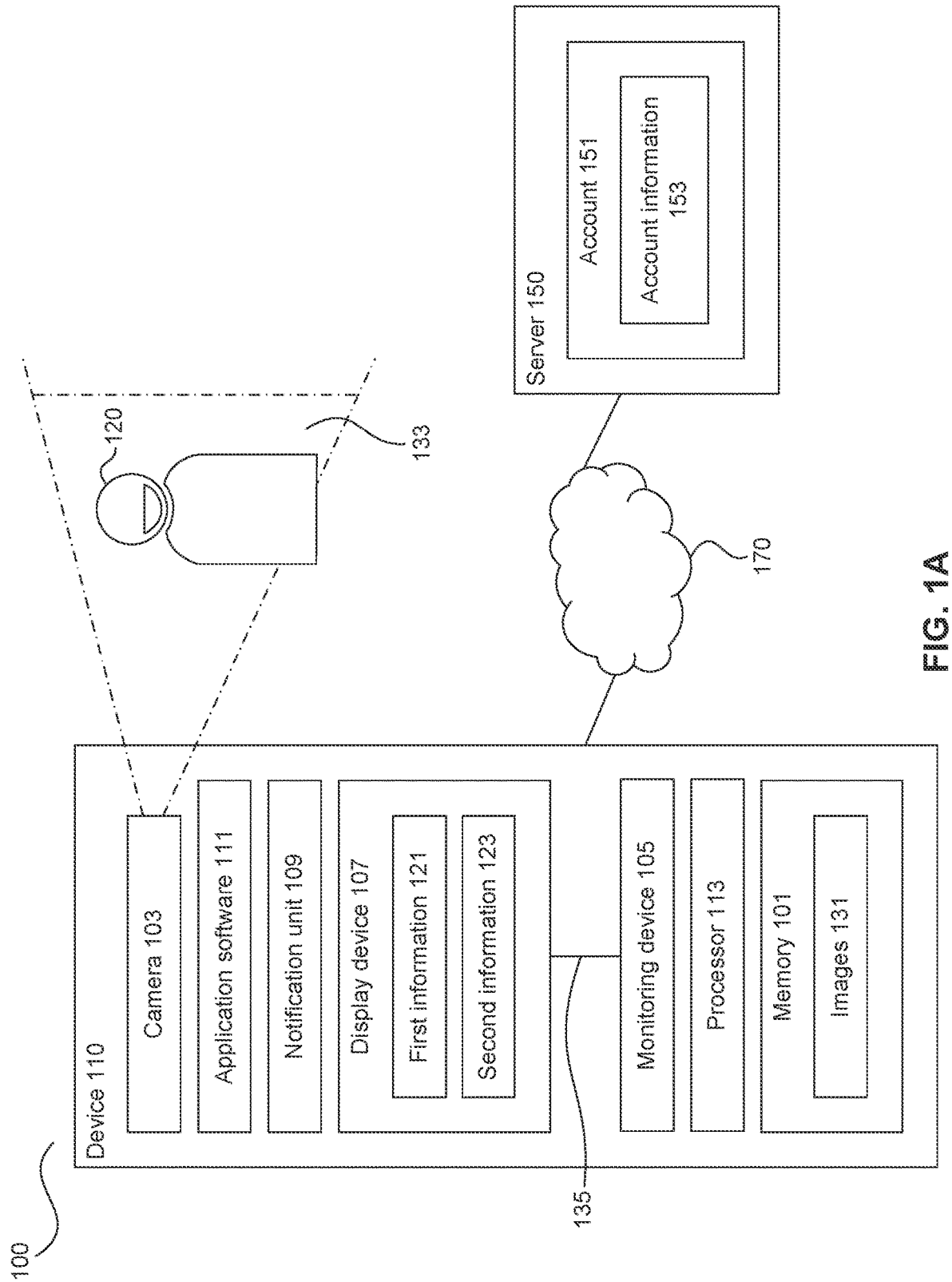

FIGS. 1A-1B show block diagrams of a system 100 according to some embodiments. For example, system 100 may be used for taking an action to protect data privacy when an unauthorized intrusion to a location is detected. It is to be understood that there may be more or fewer components included in system 100. Further, it is to be understood that one or more of the devices and components within system 100 may include additional and/or varying features from the description below, and may include any devices and components that one having ordinary skill in the art would consider and/or refer to as taking an action to protect data privacy when an unauthorized intrusion to a location is detected.

In some embodiments, as shown in FIG. 1A, system 100 can include a device 110 and a server 150 operatively coupled to each other through a network 170. Device 110 can include a memory 101, a processor 113, and a camera 103 coupled to each other. Various modules, which can be implemented as hardware, software, or a combination of hardware and software can be operated on device 110, such as a monitoring device 105, a display device 107, a notification unit 109, and an application software 111. Monitoring device 105 can be implemented by hardware, software, or a combination of hardware and software. Notification unit 109 can be a sound notification unit to generate a sound notification, a haptic notification unit to generate a haptic movement, or any other notification type. Application software 111 can be a financial software, a personal software, a health care software, a social media software, a government service software, or any other software. Application software 111 can be in communication with server 150 to provide services to user 120. For example, application software 111 can be a financial software so that user 120 can access account 151 maintained on server 150, and further present account information 153 to user 120 on display device 107.

In some embodiments, network 170 can be a "computer network" or a "communication network," which terms are used interchangeably. In some examples, network 170 can include an ad hoc network, an intranet, an extranet, a virtual private network (VPN), a local area network (LAN), a wireless LAN (WLAN), a wide area network (WAN), a wireless wide area network (WWAN), a metropolitan area network (MAN), a portion of the Internet, a portion of the Public Switched Telephone Network (PSTN), a cellular telephone network, a wireless network, a WiFi network, a WiMax network, any other type of network, or a combination of two or more such networks.

In some embodiments, server 150 can include a server device (e.g., a host server, a web server, an application server, etc.), a data center device, or a similar device. Server 150 can include a processor, an operating system, server applications operated by the processor, and a storage device coupled to the processor. The processor of server 150 can include one or more central processing units (CPUs), and a programmable device (such as a hardware accelerator or a FPGA).

In some embodiments, device 110 can be any computing device, a wireless communication device, a smart phone, a laptop, a tablet, a personal assistant, a monitor, a wearable device, an Internet of Thing (IoT) device, a mobile station, a subscriber station, a remote terminal, a wireless terminal, a video camera, an instrument, or any other user device. Device 110 can also be configured to operate based on a wide variety of wireless communication techniques. These techniques can include, but are not limited to, techniques based on 3rd Generation Partnership Project (3GPP) standards.

In some embodiments, as shown in more details in FIGS. 1A-1B, camera 103 can include a front facing camera located in device 110 so that user 120 is within a line of sight of the front facing camera. Even though only one camera is shown, there can be multiple cameras. In some embodiments, monitoring device 105 can determine whether camera 103 is enabled or not. Upon a determination that camera 103 is not enabled, monitoring device 105 can send a request to enable camera 103. Once enabled, camera 103 may capture a sequence of images 131 in a location 133, which can be saved into memory 101. In some embodiments, location 133 can include an area over a shoulder of user 120 or behind user 120. In some embodiments, location 133 can include a privacy zone comprising an area around device 110 and user 120, where data displayed on display device 107 is viewable by an unauthorized person or an unauthorized device.

In some embodiments, monitoring device 105 can determine, based on the sequence of images 131, whether an object is found in location 133. For example, to determine whether the object is found in the location, monitor device 105 can detect a change between a first set of the sequence of images 131 captured during a first time period and a second set of the sequence of images 131 captured during a second time period, where the change represents an object, an unauthorized person at the location, or an unauthorized device at the location. The object detected in location 133 may be an object different from user 120.

In response to finding the object, monitoring device 105 can generate a control signal 135 to cause device 110 to take an action. In some embodiments, control signal 135 can cause device 110 to display a flashing screen on display device 107. In some embodiments, control signal 135 can cause notification unit 109 to generate a notification to user 120 about the detected object, such as a sound notification, a haptic notification, or any other notification. User 120 may be identified by monitoring device 105 as a default object that may not trigger any action to protect the data privacy around location 133.

In some embodiments, device 110 can have first information 121 displayed on display device 107 before finding the object. And control signal 135 can cause second information 123 different from the first information 121 to be displayed on display device 107 in response to finding the object. In some embodiments, the first information 121 can include financial data, personal data, health related data, or the like, and the second information 123 can include fake data different from and potentially related to the first information 121. In some embodiments, the first information 121 can include data displayed by application software 111 and control signal 135 can cause device 110 to stop operation of application software 111.

Figure 2:
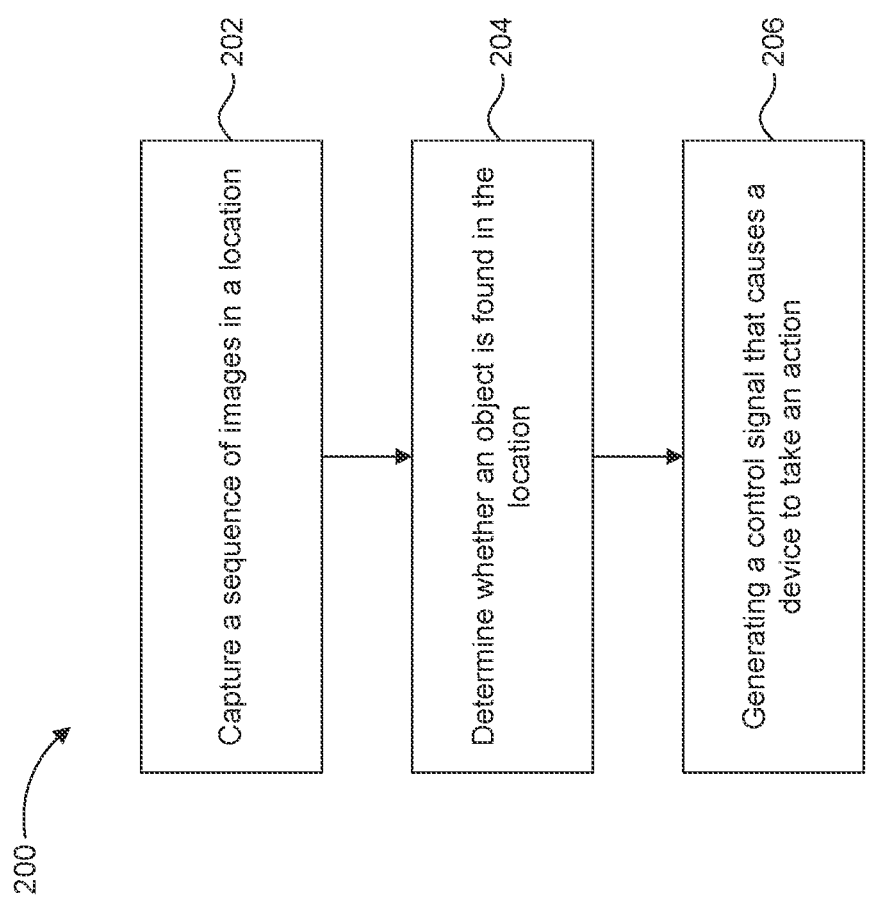
FIGS. 2-3 illustrate example processes for taking an action to protect data privacy when an unauthorized intrusion to a location is detected, according to some embodiments.
Figure 3:
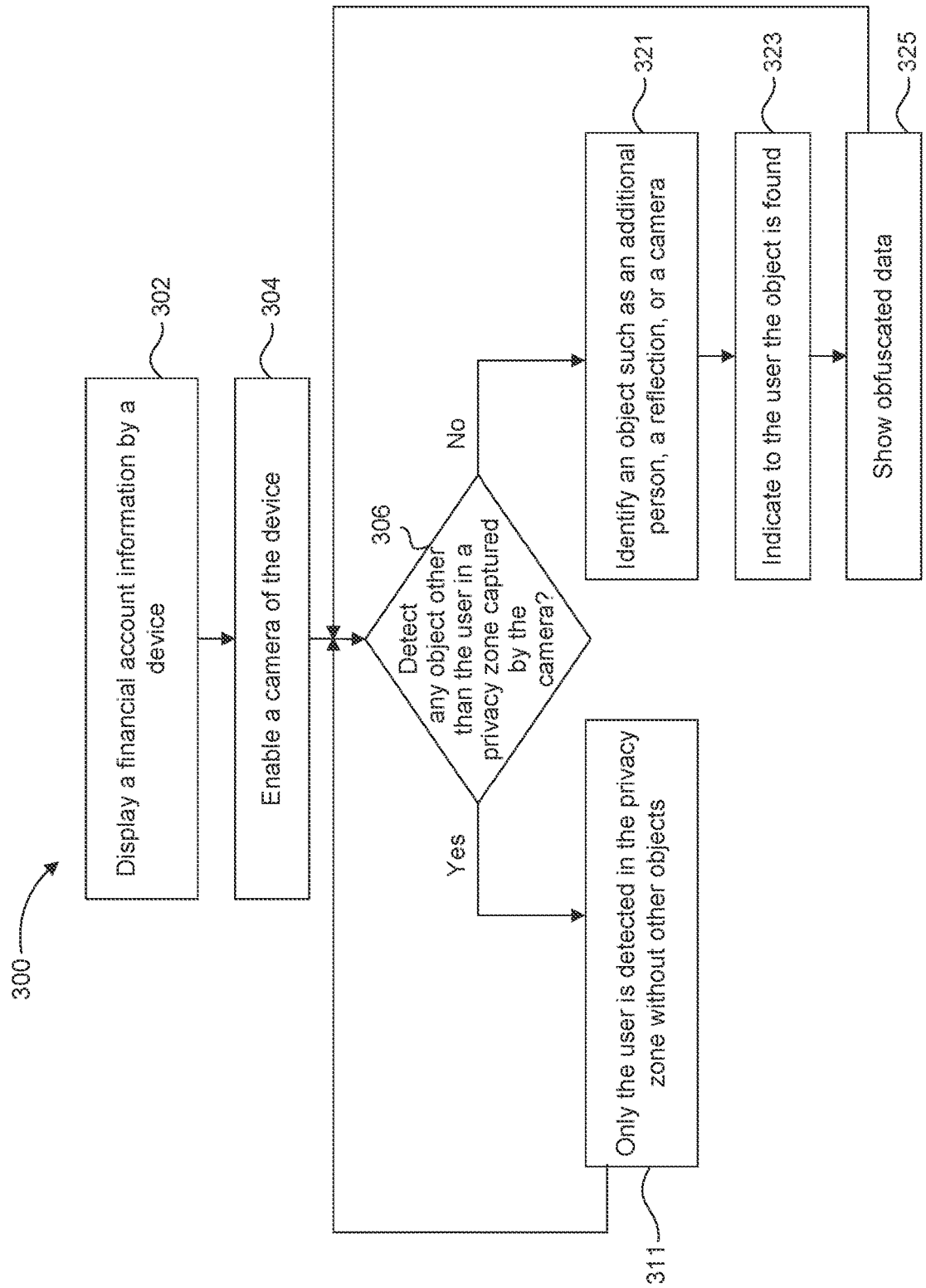

FIGS. 2-3 illustrate example processes 200 and 300, according to some embodiments. For example, process 200 and/or 300 can be for taking an action to protect data privacy when an unauthorized intrusion to a location is detected, according to some embodiments. In some embodiments, process 200 and process 300 can be performed by processing logic of device 110 that can comprise hardware (e.g., circuitry, dedicated logic, programmable logic, microcode, etc.), software (e.g., instructions executing on a processing device), or a combination thereof. For example, process 200 and process 300 can be performed by monitoring device 105, camera 103, display device 107, and others. It is to be appreciated that not all steps may be needed to perform the disclosure provided herein. Further, some of the steps may be optionally performed or performed simultaneously, or in a different order than shown in FIGS. 2-3, as will be understood by a person of ordinary skill in the art.

In one aspect, at operation 202, camera 103 can capture a sequence of images in a location. For example, monitoring device 105 can determine whether camera 103 is enabled or not. Upon a determination that camera 103 is not enabled, monitoring device 105 can send a request to enable camera 103. Once enabled, camera 103 can capture the sequence of images 131 in location 133, where the sequence of images 131 can be saved in memory 101.

In one aspect, at operation 204, based on the sequence of images 131, monitoring device 105 can determine whether an object is found in location 133. In detail, to detect an object is found in location 133, monitoring device 105 can detect a change between a first set of the sequence of images 131 captured during a first time period and a second set of the sequence of images 131 captured during a second time period. The change represents the object, which can be an unauthorized person at location 133 or an unauthorized device at location 133.

In one aspect, at operation 206, in response to finding the object, monitoring device 105 can generate control signal 135 that causes device 110 to take an action. In some embodiments, control signal 135 can cause device 110 to display a flashing screen on display device 107. In some embodiments, control signal 135 can cause notification unit 109 to generate a notification to user 120 about the detected object, such as a sound notification, a haptic notification, or any other notification. In some embodiments, device 110 can have a first information displayed on display device 107 before finding the object, and control signal 135 can cause a second information different from the first information to be displayed on display device 107 in response to finding the object.

In some embodiments, operations in process 300 may be implemented as an example for the operations in process 200. Operations in process 300 described below have some more details than operations in process 200.

In one aspect, at operation 302, device 110 can cause a financial account information being displayed on display device 107, such as account information 153 of account 151 for user 120 stored in server 150, as shown in FIG. 1A. User 120 may use application software 111 to interact with server 150 to perform transactions related to account 151, which may be a financial account.

In one aspect, at operation 304, monitoring device 105 can enable camera 103. Monitoring device 105 can determine whether camera 103 is enabled or not. Upon a determination that camera 103 is not enabled, monitoring device 105 can send a request to enable camera 103.

In one aspect, at operation 306, monitoring device 105 can detect any object other than the user is in a privacy zone captured by camera 103, such as location 133 that is a privacy zone. The objects detected in location 133 may include user 120, and may include any additional objects.

In one aspect, at operation 311, monitoring device 105 can determine that user 120 is the only object detected in privacy zone 133, and no other users or other additional or sensitive objects such as a camera is detected. Once such a determination, monitoring device 105 can transfer back to perform operation 306 without triggering any action to protect the data privacy.

In one aspect, at operation 321, monitoring device 105 can identify an object such as an additional person, a reflection, or a camera outside device 110. Identifying such an object may indicate there is an intrusion to location 133. Upon identifying such an object, at operation 323, monitoring device 105 can indicate to user 120 the object is found. Afterwards, at operation 325, monitoring device 105 can generate a control signal to cause device 110 to take an action, such as displaying obfuscated data instead of account information 153 of account 151 for user 120 stored in server 150. By showing obfuscated data, the privacy of account 151 for user 120 can be protected. In addition, monitoring device 105 can move back to operations at 306 to continue to monitor and detect objects in a privacy zone captured by camera 103, such as location 133.

Accordingly, when user 120 logs into account 151, device 110 can ask user 120 to enable camera 103, which can be a front-facing camera so that user 120 can see what is in the purview of user 120. Once camera 103 is enabled, through images captured by camera 103, monitoring device 105 can detect things that may be behind user 120, but user 120 is not aware of. If an object is detected behind user 120, device 110 or monitoring device 105 can change the data displayed on display device 107 to use fake or obfuscated data to maintain the privacy of data for user 120.

In some embodiments, objects that can be detected by camera 103 can include, but are limited to, a second face that is facing camera 103, which can indicate a person in a similar space, e.g., a train, bus, subway, plane, etc., looking over the shoulder of user 120; a child, a relative, or a friend looking over the shoulder of user 120; a camera or a phone aimed towards user 120, or a reflection of a phone screen behind user 120, such as in a window or mirror in a public space. In some embodiments, objects that can be detected by camera 103 can include anything suspicious or anything related to shoulder surfing to a normal user.

In some embodiments, monitoring device 105 can detect objects by various image processing techniques, such as computer vision and image processing techniques that deal with detecting instances of semantic objects of a certain class (such as humans, buildings, or cameras) in digital images and videos. Monitoring device 105 can apply any image retrieval and video surveillance techniques to detect objects. In some embodiments, images captured by camera 103 may not be in a faster speed such as 60 frames per second. Instead, images captured by camera 103 may be in a slower speed, such as 1 frame per second. Monitoring device 105 can detect objects based on the images captured by camera 103 in a progressive way. For example, monitoring device 105 can process a couple of images to see any object likely to be identified in the couple of images. If there is anything that looks suspicious, monitoring device 105 can continue to process the next few frames to make a more clear determination whether an object can be detected. If nothing looks suspicious, monitoring device 105 can skip a few frames to look for frames captured in the next minute. Such progressive image processing techniques can be applicable to the embodiments to detect suspicious shoulder surfing objects because it may take longer than a few seconds for shoulder surfing purpose to identify any information displayed by device 110 or application software 111.

In some embodiments, monitoring device 105 may allow certain objects to be presented in location 133 without indicating to user 120 the object is found or displaying obfuscated data. For example, monitoring device 105 may identify the object is a significant other of user 120. Accordingly, monitoring device 105 may not need to indicate to user 120 the object is found or display obfuscated data. Objects identified by monitoring device 105 may include user 120 itself. Monitoring device 105 may use object tracking or continuous tracking to keep track of user 120 itself. If only user 120 is identified by monitoring device 105, monitoring device 105 may not need to indicate to user 120 an object is found or display obfuscated data.

In some embodiments, obfuscated data or fake data may be generated based on the real data displayed on device 110. For example, the real data displayed application software 111 may be medical data or financial data. The obfuscated data may look like medical data or financial data with some details changed. For example, a fake medical data may change the name of the doctor to a fake doctor name. A fake financial data may present a fake amount of money in the account. Different obfuscated data may be generated for user 120 each time when certain objects are identified by monitoring device 105. Monitoring device 105 may further save the obfuscated data at server 150. In some embodiments, obfuscated data may be saved at server 150 together with the time and location information as when and where the obfuscated data are generated and displayed. In some embodiments, the obfuscated data may be further associated with images captured by camera 103 at the time and location when the obfuscated data are generated and displayed. The associated images, the time and location associated with the obfuscated data may all be saved on server 150, which can be retrieved later for fraud detection purpose. In some embodiments, a same obfuscated data may be used all the times to save the computation needed to generate different obfuscated data at different time and location.

In some embodiments, if obfuscated data is displayed once monitoring device 105 detects an additional person in location 133, and later the obfuscated data is used to answer authentication questions that are based on transactions, device 110 or server 150 may determine that a fraudulent user is trying to authenticate as user 120 with compromised information. Accordingly, device 110 or server 150 may place account 151 into a fraud process to enable further investigation or security protections. In some embodiments, when the obfuscated data and its associated time and location, and images are saved on server 150, device 110 or server 150 may be able to detect the exact fraudulent user. Furthermore, device 110 or server 150 may detect the Internet Protocol address of the fraudulent user, and further collect any additional information about the fraudulent user. Such collected information, the time and location, and images associated with the obfuscated data may be transmitted to the police or any legal authority for further investigation. Based on the objects identified in the images associated with the obfuscated data, server 150 may inspect any other images generated by other devices to detect additional appearance of the fraudulent user, and identify any accounts that may be related to the fraudulent user to provide further security for other accounts saved on server 150.

Figure 4:
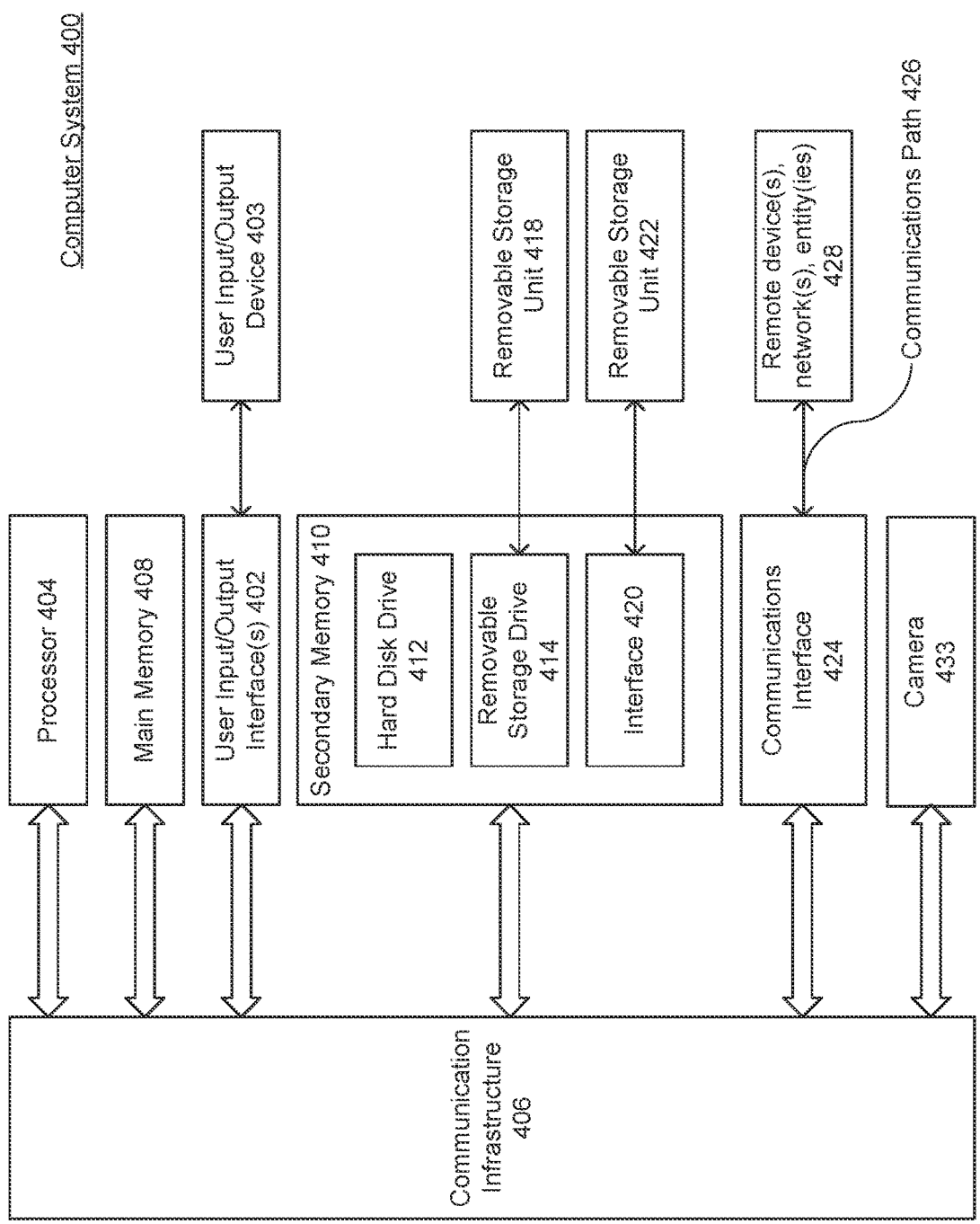
FIG. 4 is an example computer system useful for implementing various embodiments.

FIG. 4 shows a computer system 400, according to some embodiments. Various embodiments may be implemented, for example, using one or more well-known computer systems, such as computer system 400 shown in FIG. 4. One or more computer systems 400 may be used, for example, to implement any of the embodiments discussed herein, as well as combinations and sub-combinations thereof. In some examples, computer system 400 can be used to implement device 110, or server 150 as shown in FIGS. 1A-1B, or operations shown in FIGS. 2-3. Computer system 400 may include one or more processors (also called central processing units, or CPUs), such as a processor 404. Processor 404 may be connected to a communication infrastructure or bus 406.

Computer system 400 may also include user input/output device(s) 403, such as camera 433, display devices, monitors, keyboards, pointing devices, etc., which may communicate with communication infrastructure 406 through user input/output interface(s) 402.

One or more of processors 404 may be a graphics processing unit (GPU). In an embodiment, a GPU may be a processor that is a specialized electronic circuit designed to process mathematically intensive applications. The GPU may have a parallel structure that is efficient for parallel processing of large blocks of data, such as mathematically intensive data common to computer graphics applications, images, videos, etc.

Computer system 400 may also include a main or primary memory 408, such as random access memory (RAM). Main memory 408 may include one or more levels of cache. Main memory 408 may have stored therein control logic (i.e., computer software) and/or data.

Computer system 400 may also include one or more secondary storage devices or memory 410. Secondary memory 410 may include, for example, a hard disk drive 412 and/or a removable storage device or drive 414. Removable storage drive 414 may be a floppy disk drive, a magnetic tape drive, a compact disk drive, an optical storage device, tape backup device, and/or any other storage device/drive.

Removable storage drive 414 may interact with a removable storage unit 418. Removable storage unit 418 may include a computer usable or readable storage device having stored thereon computer software (control logic) and/or data. Removable storage unit 418 may be a floppy disk, magnetic tape, compact disk, DVD, optical storage disk, and/any other computer data storage device. Removable storage drive 414 may read from and/or write to removable storage unit 418.

Secondary memory 410 may include other means, devices, components, instrumentalities or other approaches for allowing computer programs and/or other instructions and/or data to be accessed by computer system 400. Such means, devices, components, instrumentalities or other approaches may include, for example, a removable storage unit 422 and an interface 420. Examples of the removable storage unit 422 and the interface 420 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 400 may further include a communication or network interface 424. Communication interface 424 may enable computer system 400 to communicate and interact with any combination of external devices, external networks, external entities, etc. (individually and collectively referenced by reference number 428). For example, communication interface 424 may allow computer system 400 to communicate with external or remote devices 428 over communications path 426, which may be wired and/or wireless (or a combination thereof), and which may include any combination of LANs, WANs, the Internet, etc. Control logic and/or data may be transmitted to and from computer system 400 via communication path 426.

Computer system 400 may also be any of a personal digital assistant (PDA), desktop workstation, laptop or notebook computer, netbook, tablet, smart phone, smart watch or other wearable, appliance, part of the Internet-of-Things, and/or embedded system, to name a few non-limiting examples, or any combination thereof.

Computer system 400 may be a client or server, accessing or hosting any applications and/or data through any delivery paradigm, including but not limited to remote or distributed cloud computing solutions; local or on-premises software ("on-premise" cloud-based solutions); "as a service" models (e.g., content as a service (CaaS), digital content as a service (DCaaS), software as a service (SaaS), managed software as a service (MSaaS), platform as a service (PaaS), desktop as a service (DaaS), framework as a service (FaaS), backend as a service (BaaS), mobile backend as a service (MBaaS), infrastructure as a service (IaaS), etc.); and/or a hybrid model including any combination of the foregoing examples or other services or delivery paradigms.

Any applicable data structures, file formats, and schemas in computer system 400 may be derived from standards including but not limited to JavaScript Object Notation (JSON), Extensible Markup Language (XML), Yet Another Markup Language (YAML), Extensible Hypertext Markup Language (XHTML), Wireless Markup Language (WML), MessagePack, XML User Interface Language (XUL), or any other functionally similar representations alone or in combination. Alternatively, proprietary data structures, formats or schemas may be used, either exclusively or in combination with known or open standards.

In some embodiments, a tangible, non-transitory apparatus or article of manufacture comprising a tangible, non-transitory computer useable or readable medium having control logic (software) stored thereon may also be referred to herein as a computer program product or program storage device. This includes, but is not limited to, computer system 400, main memory 408, secondary memory 410, and removable storage units 418 and 422, as well as tangible articles of manufacture embodying any combination of the foregoing. Such control logic, when executed by one or more data processing devices (such as computer system 400), may cause such data processing devices to operate as described herein. For example, control logic may cause processor 404 to perform operations shown in FIGS. 2-3.

Based on the teachings contained in this disclosure, it will be apparent to persons skilled in the relevant art(s) how to make and use embodiments of this disclosure using data processing devices, computer systems and/or computer architectures other than that shown in FIG. 4. In particular, embodiments can operate with software, hardware, and/or operating system implementations other than those described herein.

It is to be appreciated that the Detailed Description section, and not any other section, is intended to be used to interpret the claims. Other sections can set forth one or more but not all exemplary embodiments as contemplated by the inventor(s), and thus, are not intended to limit this disclosure or the appended claims in any way.

While this disclosure describes exemplary embodiments for exemplary fields and applications, it should be understood that the disclosure is not limited thereto. Other embodiments and modifications thereto are possible, and are within the scope and spirit of this disclosure. For example, and without limiting the generality of this paragraph, embodiments are not limited to the software, hardware, firmware, and/or entities illustrated in the figures and/or described herein. Further, embodiments (whether or not explicitly described herein) have significant utility to fields and applications beyond the examples described herein.

Embodiments have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. Also, alternative embodiments can perform functional blocks, steps, operations, methods, etc. using orderings different than those described herein.

References herein to "one embodiment," "an embodiment," "an example embodiment," or similar phrases, indicate that the embodiment described can include a particular feature, structure, or characteristic, but every embodiment can not necessarily include the particular feature, structure, or characteristic. Moreover, such phrases are not necessarily referring to the same embodiment. Further, when a particular feature, structure, or characteristic is described in connection with an embodiment, it would be within the knowledge of persons skilled in the relevant art(s) to incorporate such feature, structure, or characteristic into other embodiments whether or not explicitly mentioned or described herein. Additionally, some embodiments can be described using the expression "coupled" and "connected" along with their derivatives. These terms are not necessarily intended as synonyms for each other. For example, some embodiments can be described using the terms "connected" and/or "coupled" to indicate that two or more elements are in direct physical or electrical contact with each other. The term "coupled," however, can also mean that two or more elements are not in direct contact with each other, but yet still co-operate or interact with each other.

The breadth and scope of this disclosure should not be limited by any of the above-described exemplary embodiments, but should be defined only in accordance with the following claims and their equivalents.

It is to be appreciated that the Detailed Description section, and not the Summary and Abstract sections, is intended to be used to interpret the claims. The Summary and Abstract sections may set forth one or more but not all exemplary embodiments of the present description as contemplated by the inventor(s), and thus, are not intended to limit the present description and the appended claims in any way.

The claims in the instant application are different than those of the parent application or other related applications. The Applicant therefore rescinds any disclaimer of claim scope made in the parent application or any predecessor application in relation to the instant application. The Examiner is therefore advised that any such previous disclaimer and the cited references that it was made to avoid, may need to be revisited. Further, the Examiner is also reminded that any disclaimer made in the instant application should not be read into or against the parent application.

What is claimed is:

1. A device, comprising:
a camera configured to capture a sequence of images in a location;
a memory coupled to the camera to store the sequence of images; and
a processor configured to:
determine that an object is not present in the location based on an analysis of a first plurality of images in the sequence of images;
bypass an analysis of a second plurality of images in the sequence of images that are captured subsequent to the first plurality of images based on a determination that the object is not present in the location;
determine that the object is present in the location based on an analysis of a third plurality of images in the sequence of images that are captured subsequent to the second plurality of images; and
in response to a determination that the object is present, generate a control signal, wherein the control signal is configured to cause the device to take an action.

2. The device of claim 1, wherein the control signal is configured to cause the device to display a flashing screen on a display device coupled to the memory.

3. The device of claim 1, wherein the control signal is configured to generate a user notification of the object.

4. The device of claim 1, wherein:
the device has first information displayed on a display device before finding the object, and
the control signal is configured to display second information different from the first information on the display device in response to finding the object.

5. The device of claim 4, wherein:
the first information includes financial data, personal data, or health related data, and
the second information includes fake data different from the first information.

6. The device of claim 4, wherein:
the first information includes data displayed by an application software operated by the device, and
the control signal is configured to cause the device to stop operation of the application software.

7. The device of claim 1, wherein the camera includes a front facing camera located in the device so that a user is within a line of sight of the front facing camera.

8. The device of claim 1, wherein to determine that the object is present in the location, the processor is configured to:
detect a change between a first set of images in the third plurality of images captured during a first time period and a second set of images in the third plurality of images captured during a second time period, and
the change represents an unauthorized person at the location or an unauthorized device at the location.

9. The device of claim 1, wherein the location comprises an area over a shoulder of a user or behind the user.

10. The device of claim 1, wherein the location comprises a privacy zone comprising an area around the device and a user of the device, the privacy zone being where data displayed on a display device of the device is viewable by an unauthorized person or an unauthorized device.

11. The device of claim 1, wherein the processor is further configured to:
determine whether the camera is enabled or not; and
upon a determination that the camera is not enabled, send a request to enable the camera.

12. A computer-implemented method, the method comprising:
capturing, by a camera, a sequence of images in a location;
determining, by a processor, that an object is not present in the location based on an analysis of a first plurality of images in the sequence of images;
bypassing, by the processor, an analysis of a second plurality of images in the sequence of images that are captured subsequent to the first plurality of images based on determining that the object is not present in the location;
determining, by the processor, that the object is present in the location based on an analysis of a third plurality of images in the sequence of images that are captured subsequent to the second plurality of images; and
in response to finding the object, generating, by the processor, a control signal that causes a device to take an action.

13. The method of claim 12, wherein the control signal causes the device to display a flashing screen on a display device.

14. The method of claim 12, wherein the control signal generates a user notification of the object.

15. The method of claim 12, wherein:
the device displays first information before finding the object, and
the control signal causes second information to be displayed in response to finding the object.

16. The method of claim 15, wherein:
the first information comprises financial data, personal data, or health related data, and
the second information comprises fake data different from the first information.

17. The method of claim 15, wherein:
the first information comprises data displayed by an application software operated by the device, and
the control signal causes the device to stop operation of the application software.

18. The method of claim 12, wherein determining that the object is present in the location comprises:
detecting a change between a first set of images in the third plurality of images and a second set of images in the third plurality of images, wherein the change indicates an unauthorized person or unauthorized device is located at the location.

19. A non-transitory computer-readable medium storing instructions, the instructions, when executed by a processor, cause the processor to perform operations comprising:
capturing a sequence of images in a location;
determining that an object is not present in the location based on an analysis of a first plurality of images in the sequence of images;
bypassing an analysis of a second plurality of images in the sequence of images that are captured subsequent to the first plurality of images based on determining that the object is not present in the location;
determining that the object is present in the location based on an analysis of a third plurality of images in the sequence of images that are captured subsequent to the second plurality of images; and
in response to finding the object, generating a control signal that causes a device to take an action.

20. The non-transitory computer-readable medium of claim 19, wherein the control signal is configured to cause the device to display a flashing screen on a display device coupled to a memory.

* * * * *